United States Patent [19]
Nicholson

[11] Patent Number: 5,742,968
[45] Date of Patent: Apr. 28, 1998

[54] APPARATUS FOR REMOVING DEBRIS FROM THE GROUND

[75] Inventor: David Nicholson, Near Downham Market, United Kingdom

[73] Assignee: Nicholson Farm Machinery Company Limited, United Kingdom

[21] Appl. No.: 417,851

[22] Filed: Apr. 6, 1995

[51] Int. Cl.[6] .................................................. E01H 1/04
[52] U.S. Cl. ........................ 15/83; 56/344; 56/400.11; 15/79.2
[58] Field of Search ............................ 15/83, 84, 85, 15/86, 340.3, 340.4, 349, 78, 79.1, 79.2, 372, 373, 52.1; 56/344, 400.11, DIG. 12, 16.6

[56] References Cited

U.S. PATENT DOCUMENTS

| | | | |
|---|---|---|---|
| 1,308,004 | 6/1919 | Finkel | 15/84 |
| 2,749,564 | 6/1956 | Tally | 15/79 |
| 3,134,118 | 5/1964 | Chouinard | 15/79 |
| 3,493,987 | 2/1970 | Longnecker | 15/83 |
| 3,513,498 | 5/1970 | Bennich | 15/84 |
| 3,568,232 | 3/1971 | Swanson | 15/83 |
| 3,584,325 | 6/1971 | Larsen et al. | 15/83 |
| 3,668,730 | 6/1972 | Scharmann et al. | 15/83 |
| 3,805,310 | 4/1974 | Oberdank | 15/83 |
| 3,808,627 | 5/1974 | Doering et al. | 15/83 |
| 3,859,685 | 1/1975 | Doering et al. | 15/83 |
| 4,393,537 | 7/1983 | Reprogle et al. | 15/83 |
| 4,930,530 | 6/1990 | Crego et al. | 15/348 |
| 5,295,277 | 3/1994 | Koenigs et al. | 15/83 |
| 5,390,387 | 2/1995 | Dube et al. | 15/83 |

FOREIGN PATENT DOCUMENTS

| | | | |
|---|---|---|---|
| 1805518 | 5/1970 | Germany. | |
| 2518008 | 11/1976 | Germany. | |
| 136800 | 10/1972 | Netherlands. | |
| 1449620 | 1/1989 | U.S.S.R. | 15/83 |
| 1458470 | 2/1989 | U.S.S.R. | 15/84 |
| 106105 | 5/1917 | United Kingdom. | |
| 256352 | 8/1926 | United Kingdom. | |
| 418676 | 10/1934 | United Kingdom. | |
| 760964 | 11/1956 | United Kingdom. | |
| 1453011 | 10/1976 | United Kingdom. | |
| 1494107 | 12/1977 | United Kingdom. | |

OTHER PUBLICATIONS

Nicholson Farm Machinery Co. Ltd. brochure, "PC650 & PC1800 Paddock Cleaner".

*Primary Examiner*—Gary K. Graham
*Attorney, Agent, or Firm*—Samuels, Gauthier, Stevens & Reppert

[57] ABSTRACT

Apparatus for removing debris form the ground comprising a frame which supports a rotatable cylindrical brush having bristles projecting from its axis of rotation, a rotatable shaft member extending across the width of the brush, a scraper member extending across the width of the shaft member, and a guide member configured arcuately to follow the outside of the brush. In use, the frame is movable across the ground and the brush is in contact with the ground such that the bristles contact and catch any surface debris upon leaving the ground the bristles approach the shaft member which contra-rotates with respect to the brush such that surface debris is retained by the bristles as they move upwardly proximate the guide member which guides the debris upwardly for ejection, while the scraper member maintains the shaft member free of accumulated debris.

4 Claims, 3 Drawing Sheets ly. The invention seeks to reduce this problem.
APPARATUS FOR REMOVING DEBRIS FROM THE GROUND

BACKGROUND OF THE INVENTION

This invention relates to cleaning apparatus, and in particular but not exclusively the invention relates to paddock cleaners.

Horses and other animals can become infected with internal parasites by eating fodder containing the cysts and eggs of the parasites. The parasites are deposited on the ground by excretion from infected animals. Accordingly if paddocks are to be kept usable it is wise to collect the animal droppings. This can be time-consuming when done manually. The invention seeks to reduce this problem.

SUMMARY OF THE INVENTION

According to the invention there is provided apparatus for removing debris from the ground. The apparatus comprises a ground engaging rotatable brush, a roller generally parallel to and counter-rotatable to the brush and an arcuate guide disposed about the brush to guide debris carried by the brush.

BRIEF DESCRIPTION OF THE DRAWINGS

Embodiments of the invention will now be described with reference to the accompanying drawings in which.

DETAILED DESCRIPTION OF THE PREFERRED EMBODIMENTS

Figure 1:
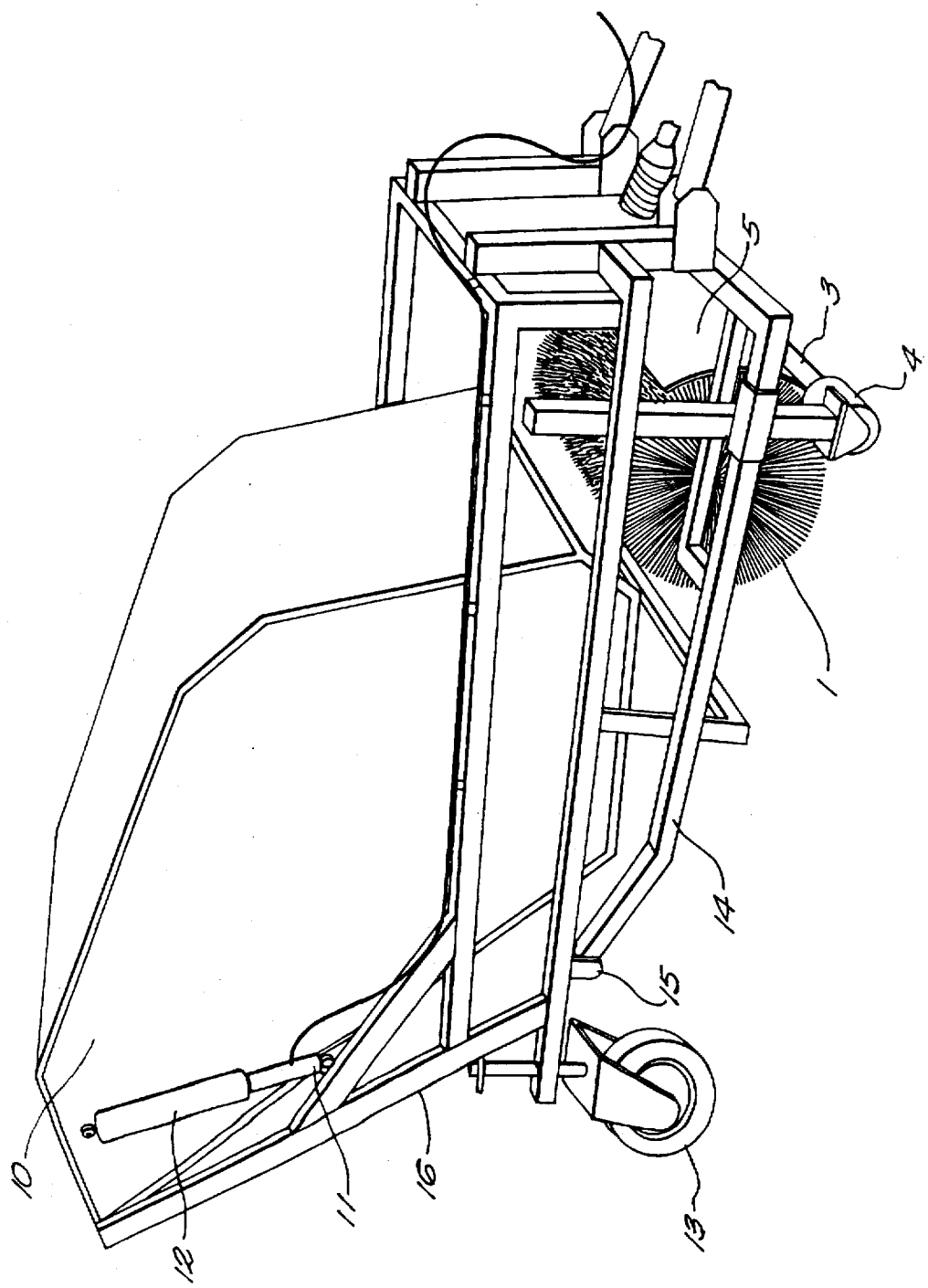
FIG. 1 is a perspective view of an apparatus in accordance with an embodiment of the invention.
Figure 2:
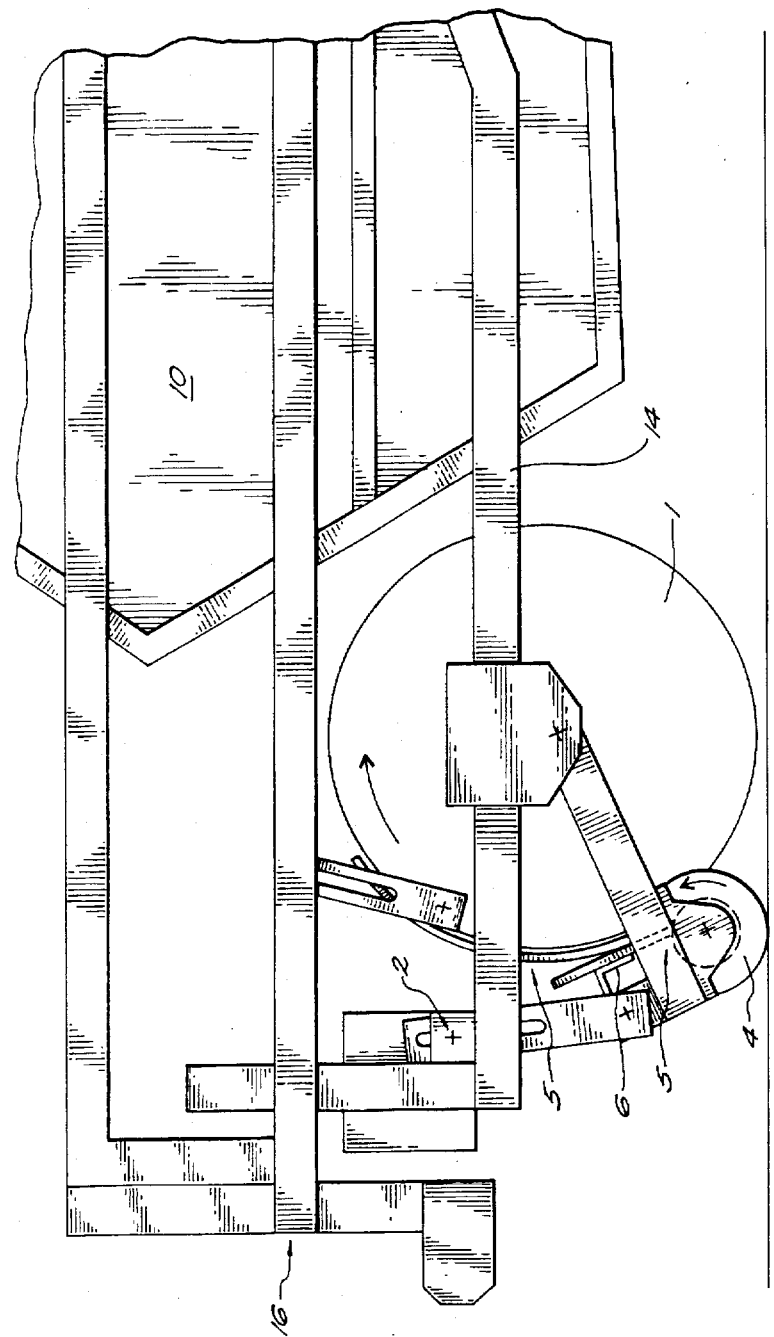
FIG. 2 is a side elevation elevational view of a portion of the apparatus shown in FIG. 1.
Figure 3:
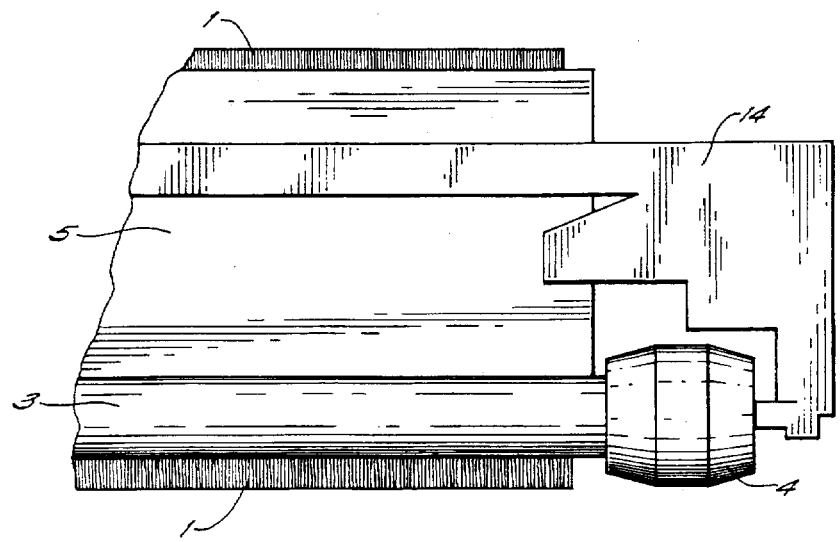
FIG. 3 is a elevational front view of a portion of the appartus shown in FIG. 1.

The apparatus is provided with a rotatable brush 1. The brush has a generally horizontal major axis. Preferably the brush is ground engaging. Preferably the brush is cylindrical but this is not essential. If it is cylindrical the brush can rotate about the i cylinder axis. The brush 1 can comprise a metallic core from which plastics, preferably polypropylene, filaments extend. Preferably the filaments are elliptical in cross-section.

Those skilled in the art will appreciate that various further embodiments and methods may be devised for rotating the brush 1 involving, for example hydraulic motors, electric motors and mechanical PTO from a towing tractor. It is preferred that the peripheral speed of the brush is, in use, slightly greater than the ground speed of the apparatus. A preferred brush is about 0.4–0.6 m especially about 0.5 m in diameter and a peripheral velocity of 2–8 $ms^{-1}$ corresponding to a rotation at about 100 to 300 rpm may be usable for a ground speed of up to 15 $kmh^{-1}$ preferably 6 to 12 $kmh^{-1}$.

In use the brush should brush the ground. In some embodiments of the invention an adjuster 2 is provided to adjust the position of the brush. In further embodiments an auto-levelling adjuster can be used.

The apparatus can be provided with a roller 3 that can be of smaller diameter than the brush 1 for example 75 to 125 mm especially about 100 mm. Roller 3 can be made of steel. Roller 3 is preferably not ground engaging but is supported so as to be preferably between 10 to 50 mm and especially between 20 to 40 mm above the ground. In some embodiments the roller is supported, typically at the ends by wheels 4. Preferably the wheels are barrel shaped. The barrel form can facilitate cornering. The wheels 4 drives the roller 3 which preferably counter-rotates relative to the brush 1.

The height of the brush axis above the ground can in some embodiments be varied by moving the roller 3 up or down relative to the apparatus frame. In some embodiments the roller is movable laterally relative to the frame. An arcuate guide 5 extends in part around the cylinder of rotation of the brush 1. The guide 5 is made of polypropylene. In some embodiments of the invention the rotating filaments contact the guide. In other embodiments they do not and may be spaced a small distance away from the filament ends. In general, one end of the guide is very close to or abuts the surface of the roller 3 and may act as a scraper scraping material from the roller 3. In certain embodiments the scraper need not be integrally formed with the arcuate guide. This facilities repair and/or replacement of the scraper in the event of damage. Typically the guide portion is made of 3 mm polypropylene and the scraper portion is made of 10 mm polypropylene.

In some embodiments the scraper is supported by a support 6. Support 6 may allow the relative positioning of the tip of the scraper and the roller 3 to be adjusted. An adjuster to adjust the spacing of the guide from the brush may be provided. This or the other adjuster can comprise a pin carried in a slotted link.

In use the apparatus is moved across the area to be cleaned with the roller 3 ahead of the brush. Because the roller does not touch the ground, debris such as horse droppings are not compressed with great force into the ground. The rotation of the roller may however lift the debris. In any event much of the debris is lifted by the rotating brush. It is then forced into between the rotating brush and guide upwardly and rearwardly. The distance projected can be varied by varying the speed of the brush.

The ejected debris can be collected in an hopper 10 for disposal for example by sale. Conveniently the hopper 10 is pivotally mounted (for example at 11) on the apparatus. Rotation of the hopper allows the collected debris to be discharged. Conveniently the hopper may be rotated by hydraulic rams 12.

The apparatus may be carried on wheels 13 although other types of carriages may be employed. In the embodiment shown castors are used for maneuverability.

The illustrated embodiment is adapted to be drawn by a tractor and is provided with a conventional tow connector and a power connector line for connection to an external power outlet port on the tractor. Those skilled in the art will appreciate that in various embodiments other forms of locomotion power may be employed.

Where the apparatus of the invention is used to clean long grass it may be desirable to provide a second brush. This brush if present is generally situated in front of the first brush, guide and roller. In general terms it is similar to the first brush although the filaments may be more rigid. The second brush is driven in the same direction as the first brush. In use the second brush lifts debris from the ground to a point part way up the long grass or possibly to the top of it. The first brush can then project it into the hopper as hereinbefore described.

As mentioned previously the invention is not restricted to the collection of animal droppings. It may be used to collect mown grass. Where this is done it is sometimes found that the cuttings encounter a standing wave of air and are not cleanly collected in the hopper. One way of overcoming this problem is to make one (or more), and preferably the top, surface of the hopper foraminous such as of fine netting. A standing wave may then not be formed.

It is preferred that brush roller and guide are carried on a subframe 14 which is articulated for example by a pivot 15 to the tractor hitch point carried on a frame 16. This decouples to an extent the brush from the tractor and reduces the tendency of the brush to leave the ground if the apparatus traverses rough ground. The castor wheels in this case are conveniently carried at the rear of the device on the main frame.

What is claimed is:

1. Apparatus for removing debris from the ground, the apparatus comprising:
   a) a frame provided with ground engaging wheels;
   b) a subframe pivotally mounted on said frame;
   c) a brush carried on said subframe for rotational movement;
   d) means for rotating said brush in a first direction;
   e) a roller having ends carried generally parallel to said brush on said subframe for rotational movement;
   f) means for rotating said roller in a direction counter to said first direction comprising second around engaging wheels supporting said ends of said roller; and
   g) an arcuate guide carried on said subframe and disposed about said brush to guide debris carried by said brush.

2. The apparatus of claim 1 wherein an end of said guide impinges against said roller.

3. The apparatus of claim 1 wherein a hopper for receiving debris is pivotally mounted on said frame.

4. Apparatus for removing debris from the ground, the apparatus comprising:
   a) a frame;
   b) ground engaging wheels carried on said frame;
   c) a hopper carried on said frame to receive debris;
   d) a subframe pivotally mounted on said frame on a first pivot;
   e) a ground engaging brush having a generally horizontal axis carried on said subframe for rotational movement;
   f) means for rotating said ground engaging brush about said generally horizontal axis;
   g) an arm mounted on a second pivot on said subframe for pivotal movement about said generally horizontal axis;
   h) a roller having an axis generally parallel to said axis of said brush said roller terminating in ground engaging wheels and having a central portion 10 to 50 mm from the ground, said roller being carried on said arm;
   i) an arcuate guide mounted on said arm and disposed about said brush;
   j) means for displacing said arm about said second pivot; and
   k) means for displacing said ground engaging brush relative to said subframe.

* * * * *